US011858747B2

(12) United States Patent
Gabriel et al.

(10) Patent No.: US 11,858,747 B2
(45) Date of Patent: Jan. 2, 2024

(54) VIBRATORY CONVEYORS HAVING MOUNTING PLATES

(71) Applicant: Vanmark Equipment, LLC, Columbus, OH (US)

(72) Inventors: Brice Robert Gabriel, San Antonio, TX (US); Tim Erwin Wolf, Ankeny, IA (US); Jack G. Wilson, D'Hanis, TX (US)

(73) Assignee: Vanmark Equipment, LLC, Columbus, OH (US)

( * ) Notice: Subject to any disclaimer, the term of this patent is extended or adjusted under 35 U.S.C. 154(b) by 0 days.

(21) Appl. No.: 17/858,539

(22) Filed: Jul. 6, 2022

(65) Prior Publication Data

US 2023/0010431 A1    Jan. 12, 2023

Related U.S. Application Data

(60) Provisional application No. 63/218,731, filed on Jul. 6, 2021.

(51) Int. Cl.
*B65G 27/20* (2006.01)
*B65G 27/08* (2006.01)
*B65G 27/04* (2006.01)

(52) U.S. Cl.
CPC ............. *B65G 27/20* (2013.01); *B65G 27/04* (2013.01); *B65G 27/08* (2013.01); *B65G 2812/0324* (2013.01)

(58) Field of Classification Search
None
See application file for complete search history.

(56) References Cited

U.S. PATENT DOCUMENTS

| 4,313,535 A | * | 2/1982 | Carmichael | B65G 27/08 198/766 |
| 5,265,730 A | * | 11/1993 | Norris | B07B 1/42 209/326 |
| 6,047,811 A | * | 4/2000 | Zittel | B65G 27/08 198/771 |

\* cited by examiner

*Primary Examiner* — William R Harp
(74) *Attorney, Agent, or Firm* — Jason H. Foster; Kremblas & Foster

(57) ABSTRACT

A vibratory conveyor for use in an industrial processing system. The vibratory conveyors include mounting plates for coupling vibratory motors of the conveyor. The mounting plates extend into tubular sidewalls of the base frame. A force-balancing member, such as a cross-member, extends between the mounting plates. The mounting plates may be a solid plate of material, such as steel.

14 Claims, 13 Drawing Sheets

VIBRATORY CONVEYORS HAVING MOUNTING PLATES

REFERENCE TO RELATED APPLICATIONS

This application claims the benefit of U.S. Provisional Application No. 63/218,731 filed Jul. 6, 2021.

BACKGROUND OF THE INVENTION

The field of the disclosure relates generally to vibratory conveyors for use in an industrial or food processing system and, more particularly, to mounting plates for connecting vibratory motors to a frame of the vibratory conveyor.

A vibratory conveyor operates by imparting vibratory energy to a material to propel it along the length of the conveyor. Such conveyors typically employ one or more vibratory motors having eccentric weights which rotate to generate the vibratory energy. The motors are attached to the base of the conveyor at a specified location and pitch angle. Two motors can be synchronized to create an oscillating linear force perpendicular to its axis of rotation that induces vibrations in a pan that carries the material. The vibration of the pan causes the material to be "thrown" upwards and forward along the conveyor. The "throw distance," or the operating speed of the conveyor, can be controlled by adjusting the position of the eccentric weights.

Vibratory conveyors are often used in applications where sanitation is paramount, such as food processing and pharmaceutical applications. Without a belt or other moving parts in contact with the conveyed material, there are few crevasses that can harbor bacteria and other contaminants. Additionally, vibratory conveyor components have a longer operational life and lower preventative maintenance requirements. The ease of sanitation and infrequency of required maintenance allows vibratory conveyors to operate with less downtime than other types of conveyors.

Despite their numerous benefits, vibratory conveyors are susceptible to vibration-induced structural damage. The vibratory motors generate cyclic stresses in the conveyor frame, which can lead to the formation of fatigue cracks or other structural damage. Components that are thin or joined by welds are subject to higher stress amplitudes, which limits the level of cyclic stresses they can tolerate. Thus, there is a need for a vibratory conveyor designed to withstand high levels of vibratory loads.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY OF THE INVENTION

One aspect of the present disclosure is directed to a vibratory conveyor. The vibratory conveyor includes a pan for moving material from a first end of the pan to a second end of the pan. The conveyor includes a base frame that supports the pan. The base frame is connected to the pan with a flexible spring. The base frame is disposed above or below the pan. The base frame includes a first side that includes a tubular sidewall segment having an inner chamber and a first mounting plate for mounting a vibratory motor. The first mounting plate has a first end and a second end. An end of the first mounting plate is disposed within the inner chamber. The base frame includes a second side that includes a tubular sidewall segment having an inner chamber and a second mounting plate for mounting a vibratory motor. The second mounting plate has a first end and a second end. An end of the second mounting plate is disposed within the inner chamber.

Another aspect of the present disclosure is directed to a vibratory conveyor. The vibratory conveyor includes a pan for moving material from a first end of the pan to a second end of the pan. The conveyor includes a base frame that supports the pan. The base frame is disposed below the pan. The base frame includes a first solid plate having a first width and a second solid plate having a second width. A cross-member extends continuously between the first solid plate and the second solid plate. The cross-member is a cylindrical tube having a diameter. The ratio of the diameter of the cylindrical tube to the width of the first solid plate is at least 0.5 and the ratio of the diameter of the cylindrical tube to the width of the second solid plate being at least 0.5.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

Figure 1:
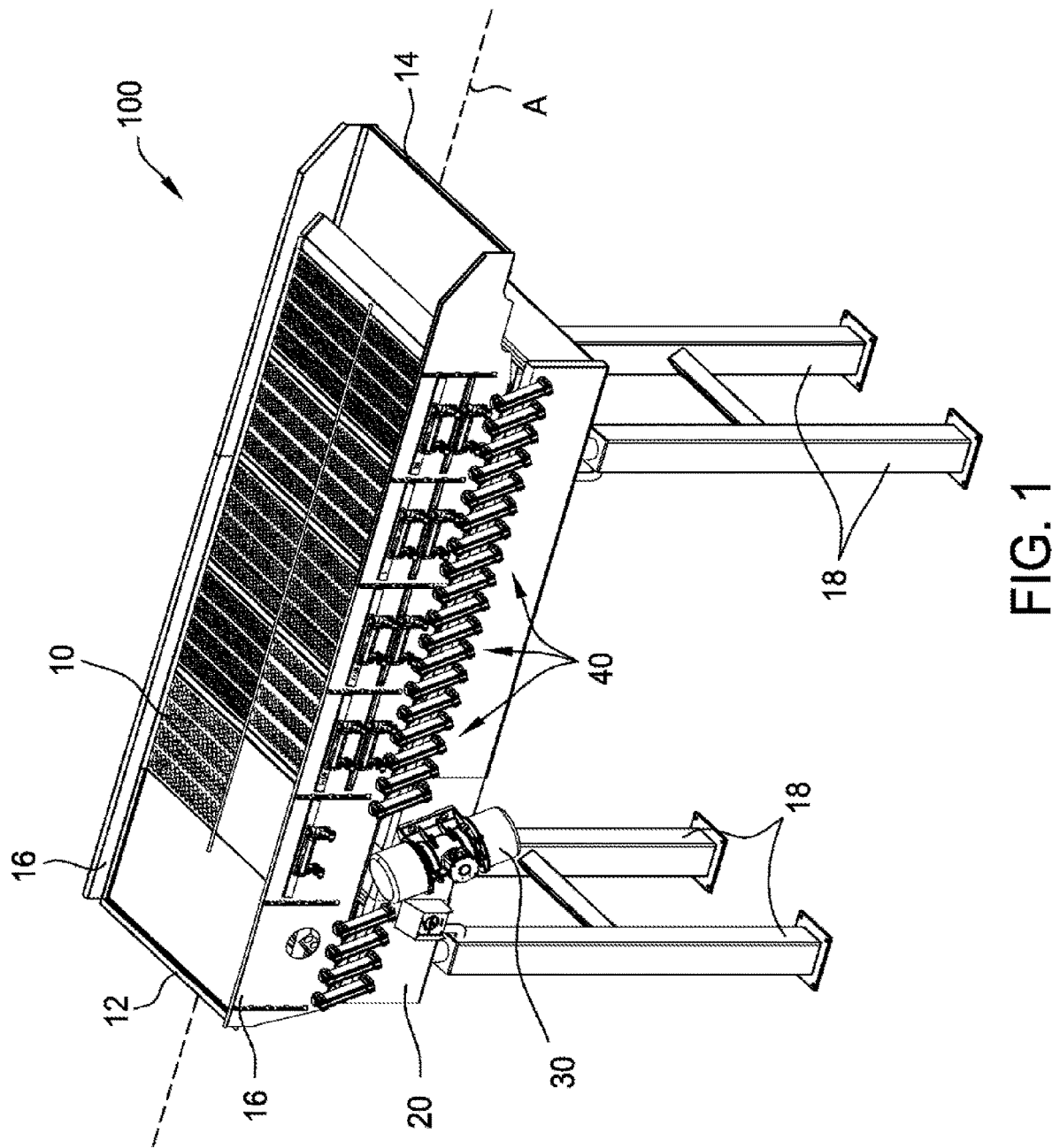
FIG. 1 is a FIG. 1 is a perspective view of a vibratory conveyor.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

Provisional patent application Ser. No. 63/218,731, filed Jul. 6, 2021, is hereby incorporated in this application by reference.

A vibratory conveyor 100 comprising a pan 10 and a base frame 20 is shown in FIGS. 1-4. The pan 10 is configured to move material from a first end 12 of the pan 10 to a second end 14 of the pan 10. In some embodiments, the pan 10 may be a smooth, continuous surface. In other embodiments, the pan 10 may be a screen or may have a plurality of recesses or protrusions. The pan 10 may have guard rails 16 along its edges to prevent material from spilling during operation. The pan 10 may be made of stainless steel or any other material that allows the vibratory conveyor 100 to function as described herein.

The base frame 20 is typically disposed below the pan 10. In other embodiments, the base frame 20 may be above the pan 10, or it may be above and below the pan 10 in a "Z" configuration. The base frame 20 is coupled to the pan 10 by a plurality of linear springs 40 to support the pan 10. In other embodiments, the base frame 20 is mounted directly to the pan 10 without being suspended by springs (or is integrated as part of the pan 10).

Figure 2:
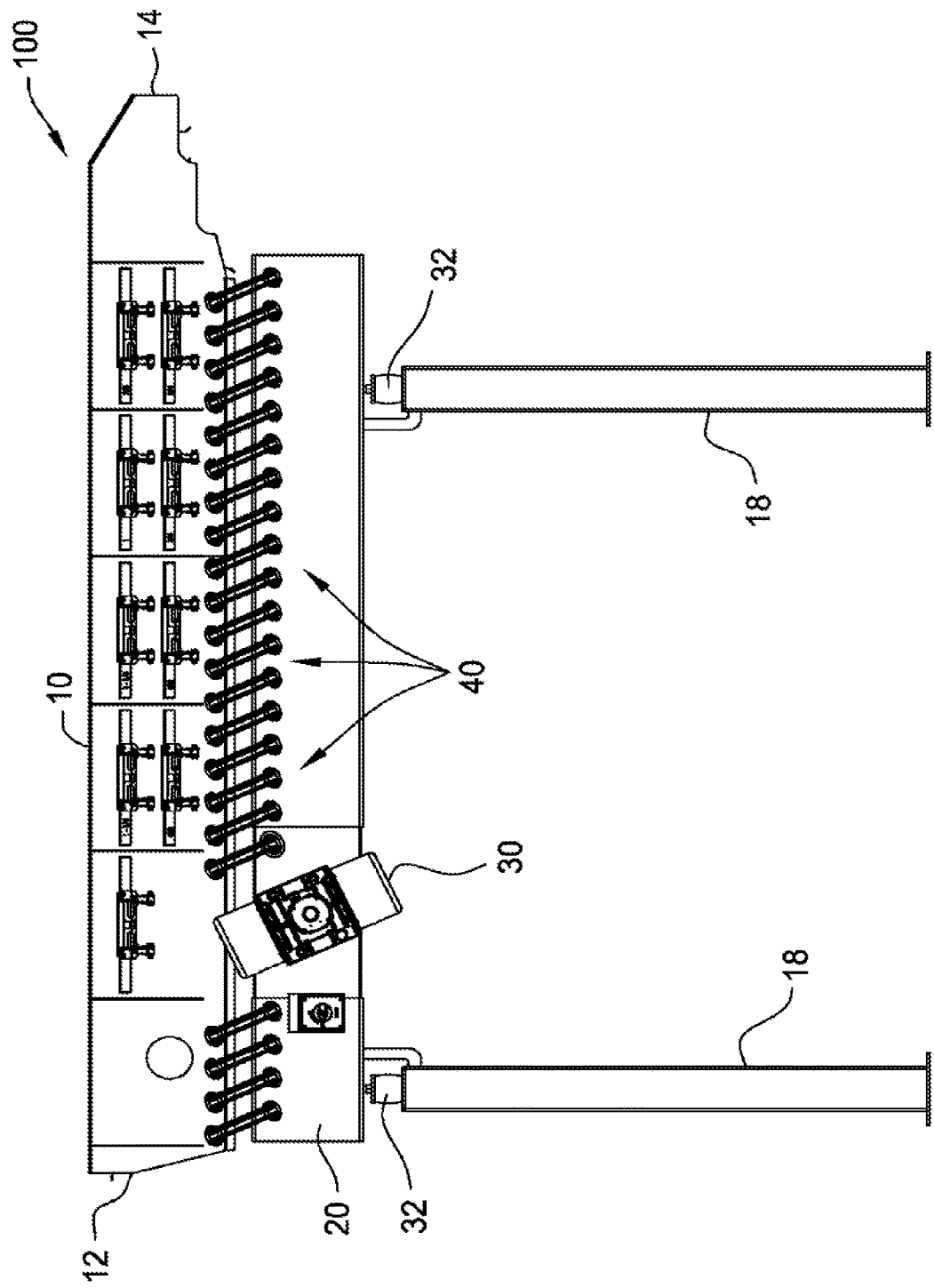
FIG. 2 is a side view of the vibratory conveyor.
Figure 3:
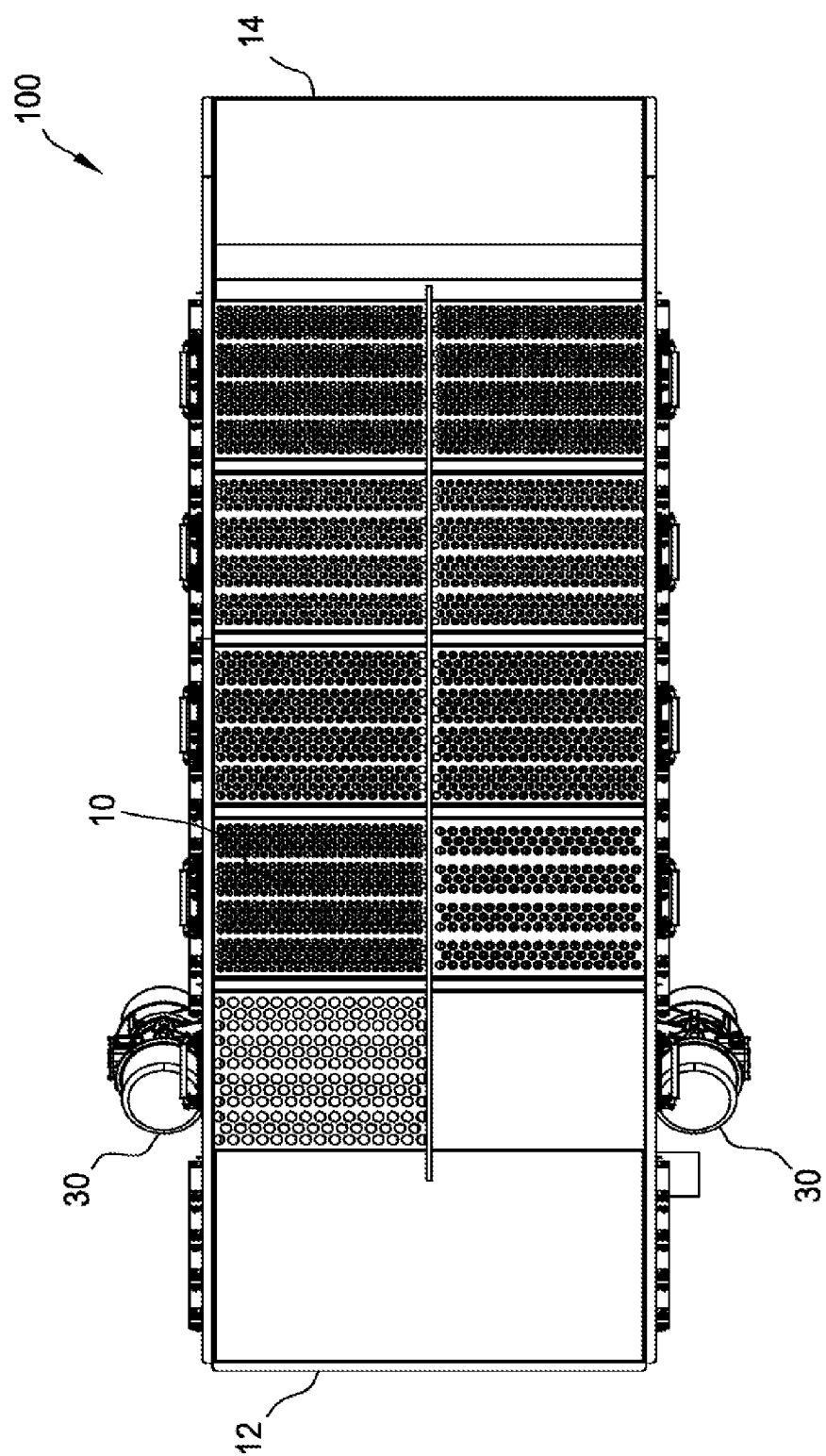
FIG. 3 is a top view of the vibratory conveyor.
Figure 4:
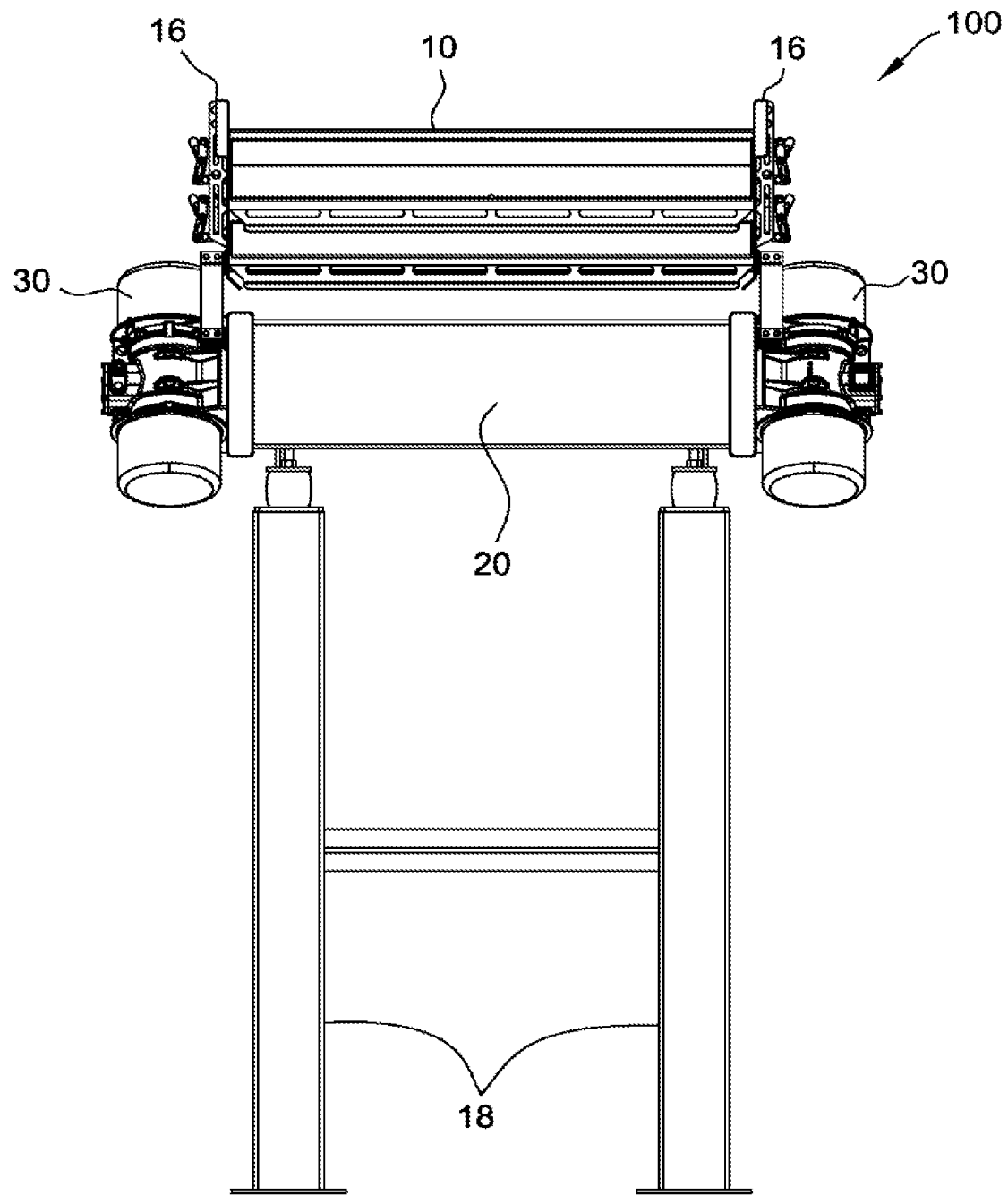
FIG. 4 is a front view of the vibratory conveyor.

The base frame 20 may stand on a plurality of legs 18 or it may stand on another suitable mount. The legs 18 may be bolted to the floor or the frame may be free-standing. As shown in FIG. 2, the base frame 20 rests on isolators 32 (e.g., coil springs, rubber elements, gas springs, or air bags) to isolate the vibratory movement of the base frame 20 from the legs 18. In other embodiments, the base frame 20 may be suspended from above.

The vibratory conveyor 100 includes first and second vibratory motors 30 (FIGS. 3 and 4) which are connected to the base frame 20 to generate vibratory energy. The vibratory motors 30 are disposed opposite each other across the center longitudinal axis A (FIG. 1) of the vibratory conveyor 100. The vibratory motors 30 may be eccentric rotating mass motors. For example, the vibratory motors 30 may include an AC motor with one or more eccentrically loaded weights attached to a motor shaft.

Figure 5:
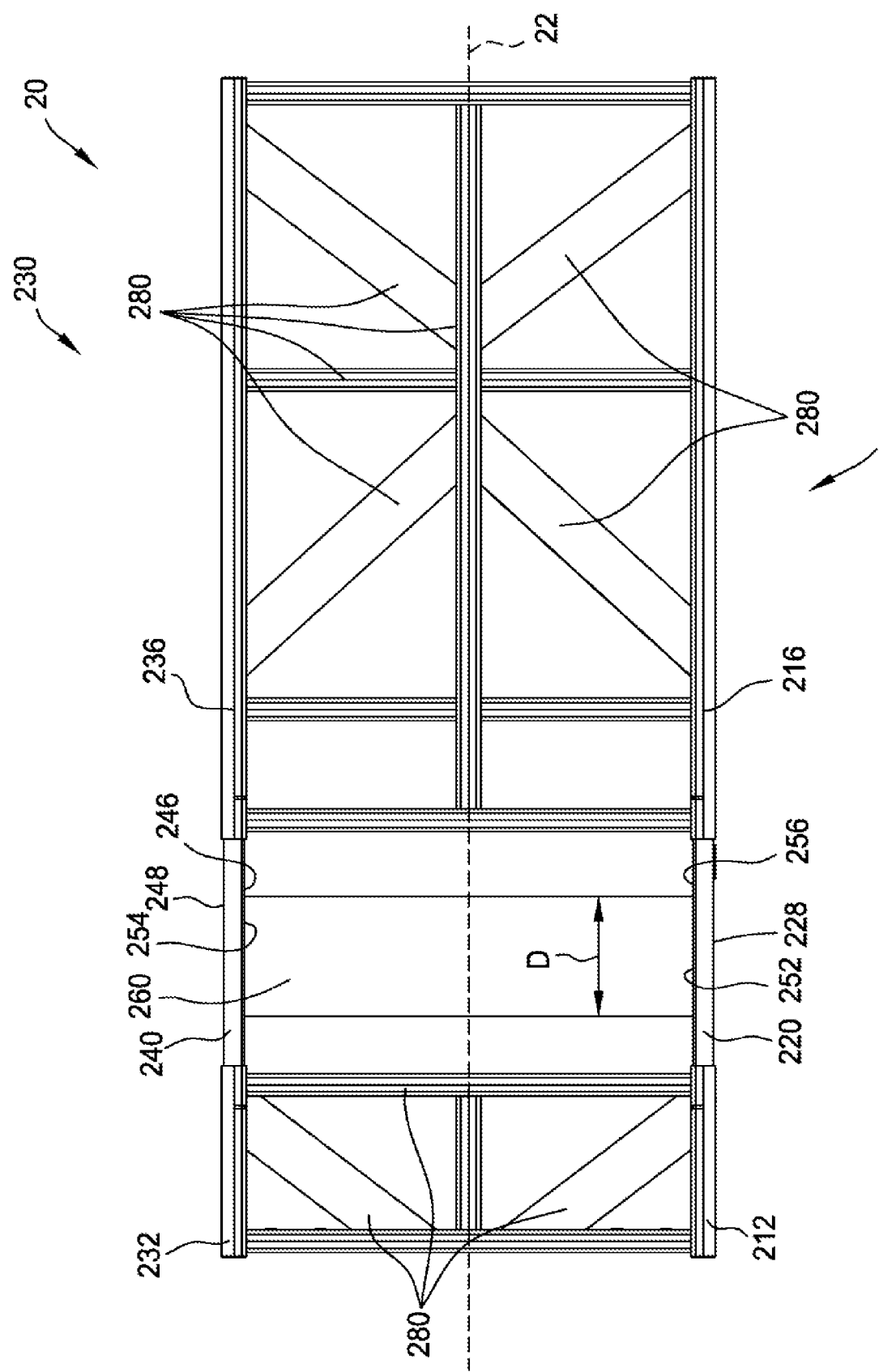
FIG. 5 is a top view of a base frame of the vibratory conveyor.

Referring now to FIG. 5, the base frame 20 has a first side 210 and a second side 230. The first and second sides 210, 230 may be mirrored about a center plane 22 of the base frame 20. The first side 210 includes a first tubular sidewall segment 212, a second tubular sidewall segment 216, and a first mounting plate 220. Generally, a "tubular sidewall" may be a sidewall having sides that enclose an open chamber within the sidewall. There may be four sides in the sidewall segments 212, 216, but there may be more or fewer. The first and second tubular sidewall segments 212, 216 may be formed from one continuous component, or they may be formed from two or more components joined together by welding along weld lines. It will be understood by the person of ordinary skill that the term "welding," "welds," "weld lines" and similar terms refer to the common process and resulting structure caused by attaching two or more parts together by melting some portion of the parts and/or another source of similar material, with the result that the parts are joined together along a line (straight, curved and/or irregular) where the material(s) is melted and then subsequently solidified.

The first mounting plate 220 may be a "solid" body without an open chamber as is intentionally formed in the tubular sidewall segments to receive the mounting plates. The first mounting plate 220 has an inner face 256 and an outer face 228. The outer face 228 is configured to receive one of the vibratory motors 30 in a mounting configuration. The first mounting plate 220 includes a plurality of apertures 225 (FIG. 6) extending through a thickness of the plate 220 for receiving motor mount fasteners (not shown). The vibratory motor 30 is connected to the first mounting plate 220 by a plurality of bolts or another suitable motor mount fastener.

Correspondingly, the second side 230 includes a third tubular sidewall segment 232, a fourth tubular sidewall segment 236, and a second mounting plate 240. The third and fourth tubular sidewall segments 232, 236 may be formed from one continuous component, or they may be formed from two or more components joined together by welds along weld lines. The second mounting plate 240 may be a "solid" body, similar to the first mounting plate 220 described above, that has an inner face 246 and an outer face 248. The outer face 248 is configured to receive one of the vibratory motors 30 in a mounting configuration. The second mounting plate 240 includes a plurality of apertures 226 (not shown) extending through a thickness of the plate 240 for receiving a motor mount fastener. The vibratory motor 30 is connected to the second mounting plate 240 by a plurality of bolts or another suitable motor mount fastener.

The apertures 225 of the first mounting plate 220 and the apertures 226 of the second mounting plate 240 may terminate within the respective mounting plate 220, 240. Alternatively, the apertures 225, 226 may be through-holes that extend through the entire thickness of the mounting plate 220, 240. In yet other embodiments, the apertures 225, 226 terminate within a force-balancing member 260 described further below.

The vibratory conveyor 100 includes a force-balancing member 260 extending between the first and second sides 210, 230 of the base frame 20. In the illustrated embodiment, the force-balancing member 260 extends continuously between the first and second mounting plates 220, 240. In this regard, a first end 252 of the force-balancing member 260 is connected to the inner face 256 of the first mounting plate 220 and a second end 254 of the force-balancing member 260 is connected to the inner face 246 of the second mounting plate 240. In some embodiments, the first end 252 of the force-balancing member 260 is welded to the inner face 256 of the first mounting plate 220, and the second end 254 of the force-balancing member 260 is welded to the inner face 246 of the second mounting plate 240. In other embodiments, the force-balancing member 260 attaches to a structure mounted to the mounting plates 220 and 240. The member 260 may include two or more segments that are directly or indirectly connected together, but is preferably a solid, continuous body from one mounting plate to the other mounting plate.

In some embodiments, the force-balancing member 260 is made of steel, such as stainless steel, in a cylindrical tube shape having a diameter D. In other embodiments, the force-balancing member 260 is a cylinder that has a different cross-sectional shape, such as being rectangular (including square), or has an open shape. The force-balancing member 260 may be tubular, which defines a chamber or void within the member 260. In other embodiments, the force-balancing member 260 may be a solid component without a chamber formed within the member 260.

The base frame 20 further includes a plurality of crossbeams 280 to provide structural support to the base frame 20. The crossbeams 280 may be arranged parallel or perpendicular to the first and second sides 210, 230 or, as in the illustrated embodiment, they may be arranged diagonally across the width of the base frame 20.

Figure 7:
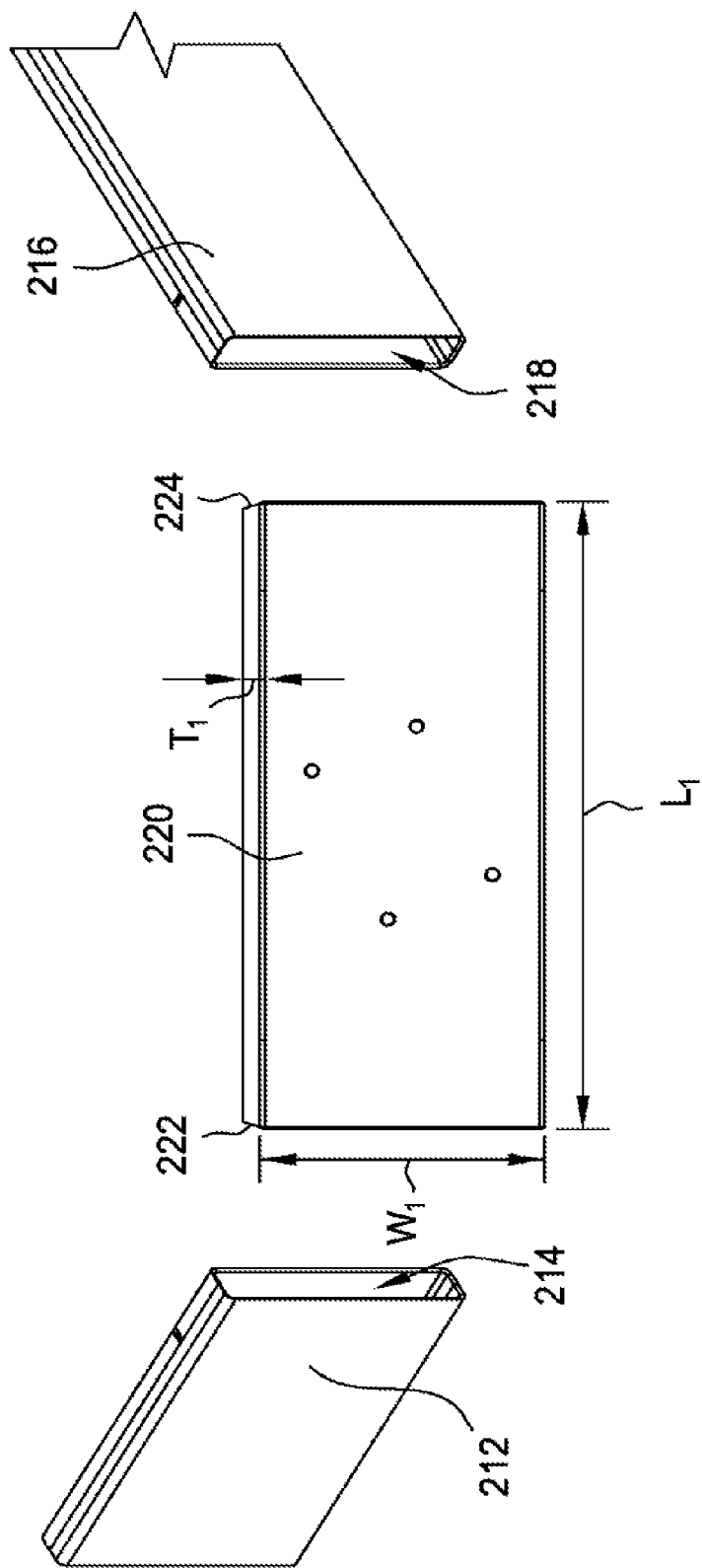
FIG. 7 is an exploded view of a first mounting plate, a first tubular sidewall, and a second tubular sidewall of the base frame.

With reference to FIG. 7, the first mounting plate 220 has a length $L_1$, a width $W_1$, and a thickness $T_1$. In some embodiments, the ratio of the diameter D (FIG. 5) of the force-balancing member 260 to the width $W_1$ of the first mounting plate 220 is at least 0.35 or 0.4. In other embodiments, the ratio of the diameter D of the force-balancing member 260 to the width $W_1$ of the first mounting plate 220 is at least 0.5. In other embodiments, the ratio of the diameter D of the force-balancing member 260 to the width $W_1$ of the first mounting plate 220 is at least 0.67 or even at least 0.75.

In some embodiments, the thickness $T_1$ of the first mounting plate 220 (i.e., the minimum thickness over its length) is at least 0.5 inches. In other embodiments, the thickness $T_1$ of the first mounting plate 220 is at least one inch. In further embodiments, the thickness $T_1$ of the first mounting plate 220 is at least two inches. In further embodiments, the thickness $T_1$ of the first mounting plate 220 is about five inches. The first mounting plate 220 may be a solid plate of metal, such as steel, and more specifically stainless steel. Of course, other materials may be substituted.

Figure 8:
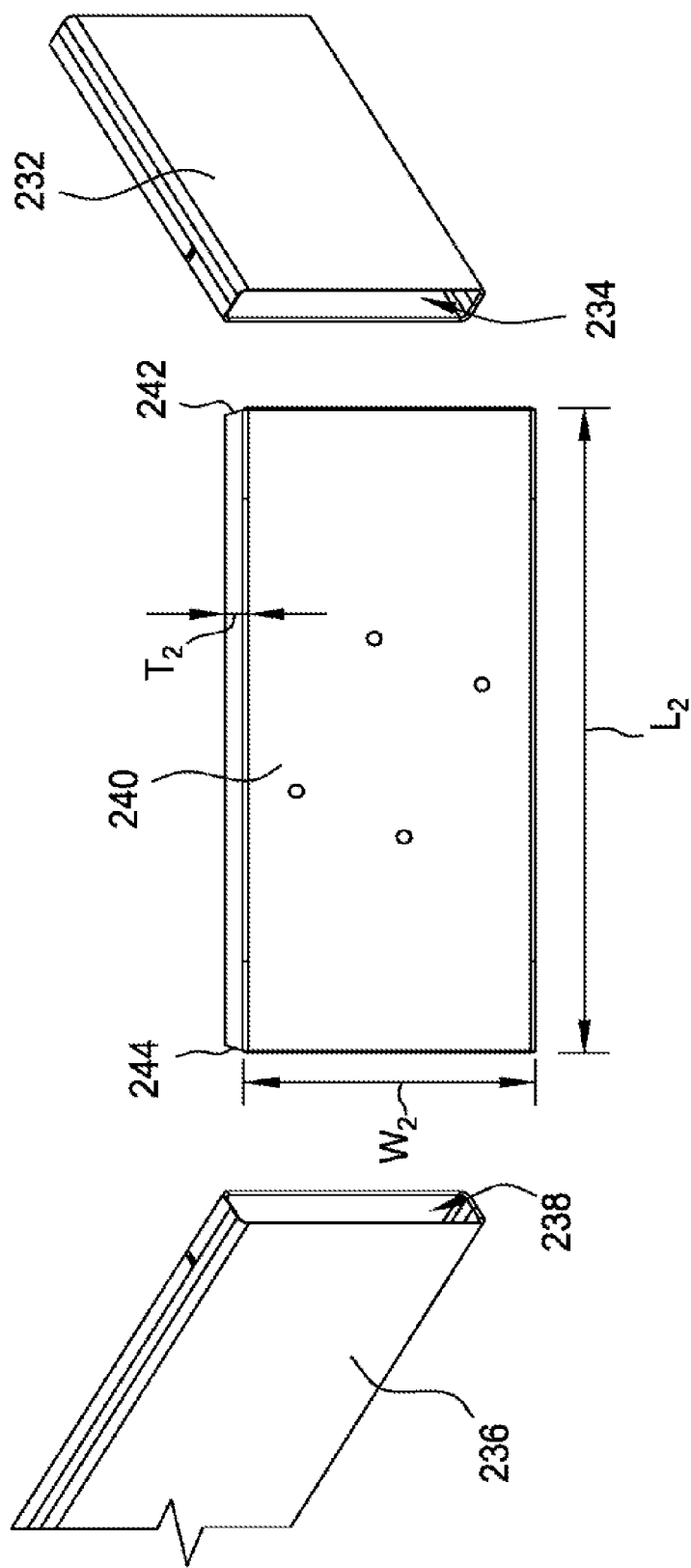
FIG. 8 is an exploded view of a second mounting plate, a third tubular sidewall, and a fourth tubular sidewall of the base frame.

Correspondingly, and with reference to FIG. 8, the second mounting plate 240 has a length $L_2$, a width $W_2$, and a thickness $T_2$. In some embodiments, the ratio of the diameter D of the force-balancing member 260 to the width $W_2$ of the second mounting plate 240 is at least about 0.35 or 0.4. In some embodiments, the ratio of the diameter D of the force-balancing member 260 to the width $W_2$ of the second mounting plate 240 is at least 0.5 or, as in other embodiments, is at least 0.67 or even at least 0.75. In some embodiments, the thickness $T_2$ of the second mounting plate 240 (i.e., the minimum thickness across its length) is at least 0.5 inches, at least one inch or at least two inches. In further embodiments, the thickness $T_2$ of the second mounting plate 240 is about five inches. The second mounting plate 240 may be a solid plate of metal.

It should be noted that the dimensions and ratios disclosed herein are exemplary. Generally any suitable value may be used depending on the size of the motor and type of conveyor.

Figure 9:
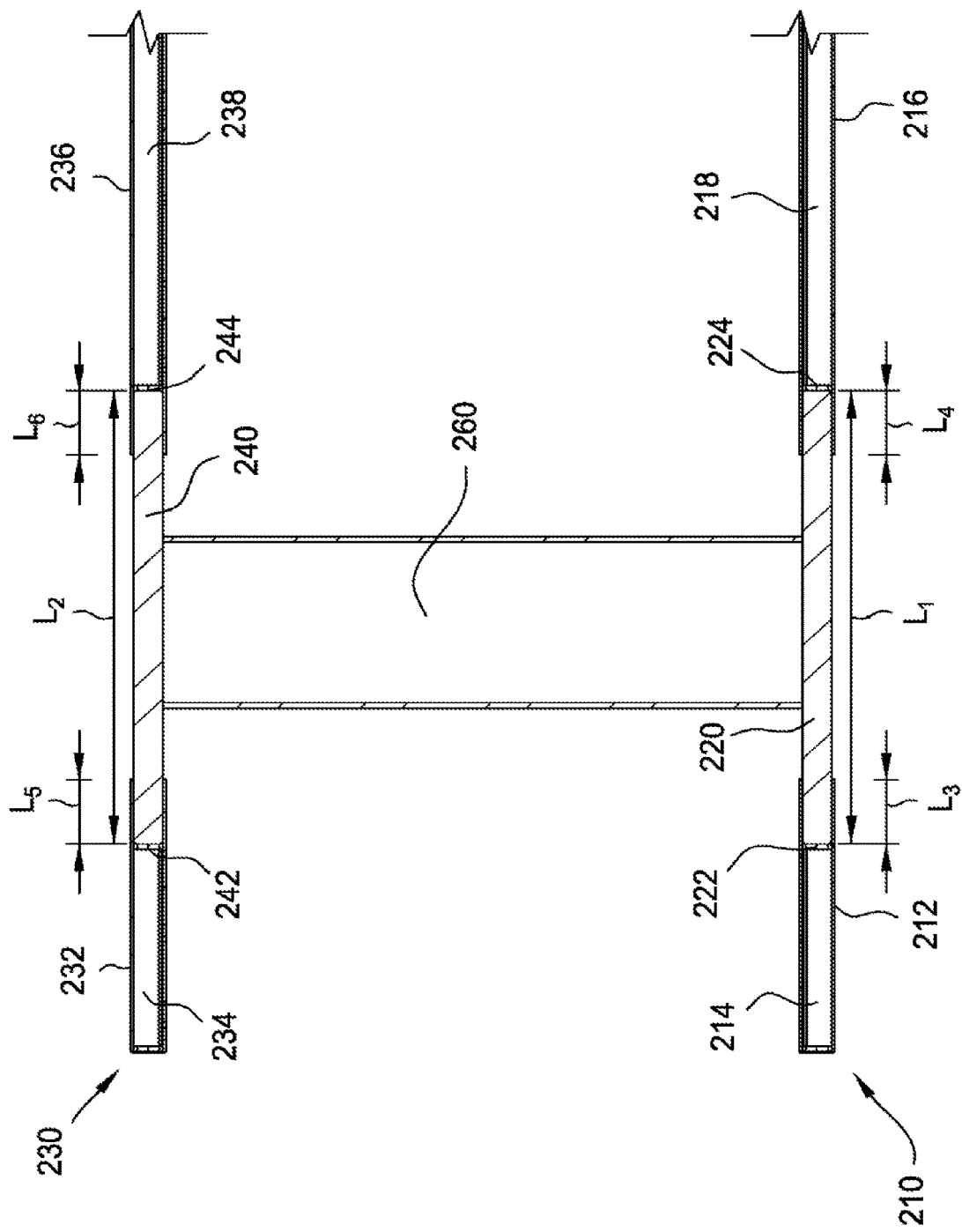
FIG. 9 is a cross-section view of a force-balancing member, the first and second mounting plates, and the first, second, third, and fourth tubular sidewalls of the base frame.

The first tubular sidewall segment 212 (FIG. 7) defines a first inner chamber 214 and the second tubular sidewall segment 216 defines a second inner chamber 218. The first mounting plate 220 has a first end 222 that is disposed within the first inner chamber 214 (FIG. 9). In certain embodiments, the length $L_3$ (FIG. 9) of the first mounting plate 220 that extends into the first inner chamber 214 is at least about $T_1$. The first mounting plate 220 also has a second end 224 that is disposed within the second inner chamber 218. In some embodiments, the length $L_4$ (FIG. 9) of the first mounting plate 220 that extends into the second inner chamber 218 is at least about $T_1$.

Figure 6:
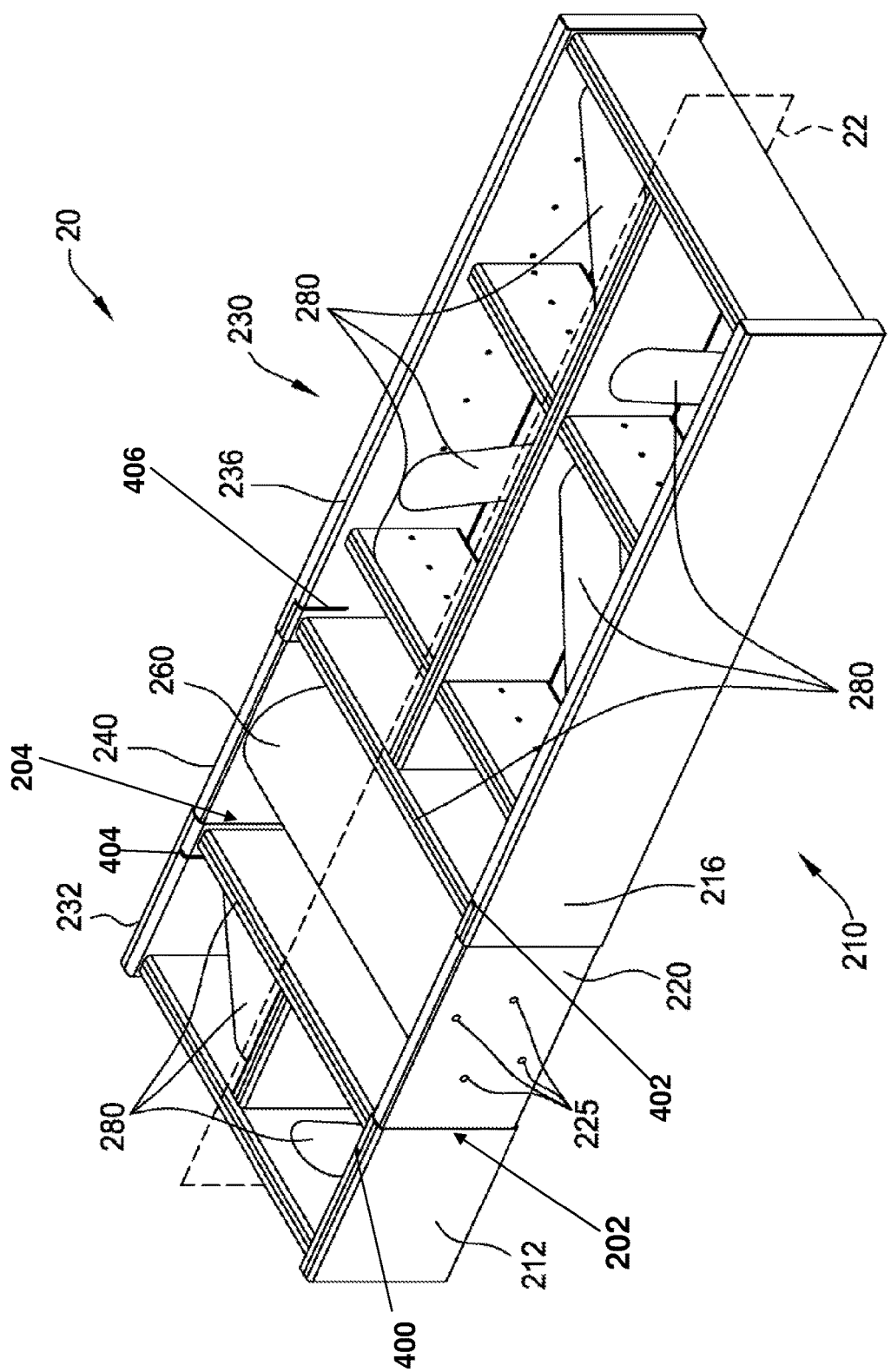
FIG. 6 is a perspective view of the base frame.

The first mounting plate 220 may be fixed to each of the first and second tubular sidewall segments 212, 216 by any suitable fastener, including forming one or more welds along lines at the juncture of the mounting plate 220 and the respective ends of the sidewall segment 212, 216. In some embodiments, these weld lines are the only weld lines formed on the first mounting plate 220 for mounting the motor 30 to the base frame 20. That is, the first mounting plate 220 does not include any weld lines for mounting the motor 30 to the base frame 20 closer to the mounting apertures 225 (FIG. 6).

Similarly, and with reference to FIG. 8, the third tubular sidewall segment 232 defines a third inner chamber 234, and the fourth tubular sidewall segment 236 defines a fourth inner chamber 238. The second mounting plate 240 has a first end 242 that is disposed within the third inner chamber 234 (FIG. 9). In some embodiments, the length $L_5$ (FIG. 9) of the second mounting plate 240 that extends into the third inner chamber 234 is at least about $T_2$. The second mounting plate 240 also has a second end 244 that is disposed within the fourth inner chamber 238. In certain embodiments, the length $L_6$ (FIG. 9) of the second mounting plate 240 that extends into the fourth inner chamber 238 is at least about $T_2$.

The second mounting plate 240 may be fixed to each of the third and fourth tubular sidewall segments 232, 236 by any suitable fastener, including forming one or more weld lines along the juncture of the mounting plate 240 and respective ends of the tubular sidewall segment 232, 236. In some embodiments, these weld lines are the only weld lines formed on the second mounting plate 240 for mounting the motor 30 to the base frame 20. That is, the second mounting plate 240 does not include any weld lines for mounting the motor 30 to the base frame 20 closer to the mounting apertures 226.

Figure 10:
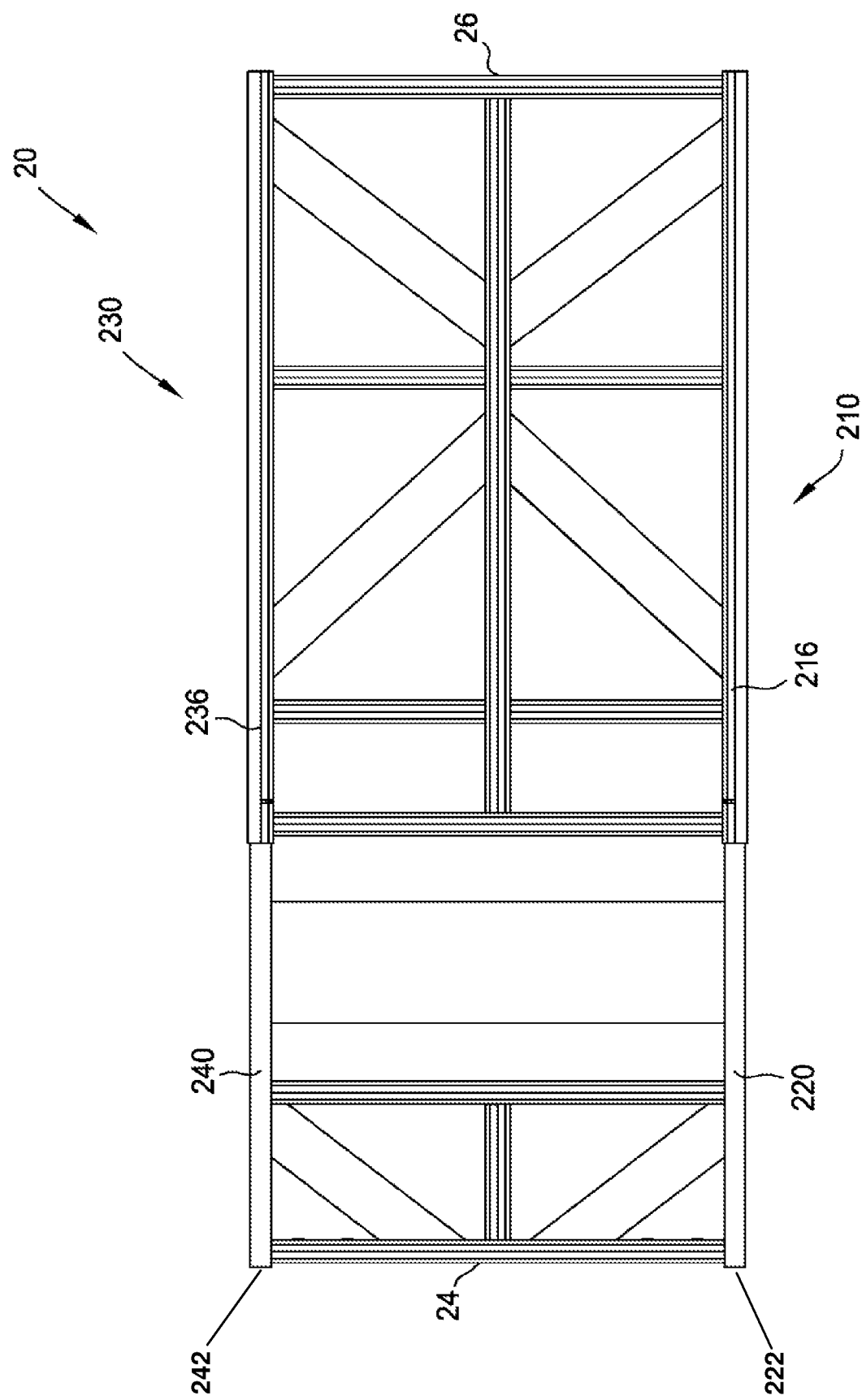
FIG. 10 is a top view of another embodiment of a base frame of the vibratory conveyor.

In some embodiments, the first and/or second mounting plates 220, 240 extend to an end of the base frame 20 such that only one end of each of the first and second mounting plates 220, 240 is disposed inside a tubular sidewall. For example and with reference to FIG. 10, the first and second mounting plates 220, 240 extend toward a first end 24 of the base frame 20 such that the first end 222 of the first mounting plate 220 and the first end 242 of the second mounting plate 240 are substantially coterminous with the first end 24 of the base frame 20. That is, the first ends 222 and 242 are planar with the first end 24 shown in FIG. 10. In such embodiments, the second and third tubular sidewall segments 216, 236 are the only tubular sidewall segments of the base frame 20, and the second and third inner chambers 218, 234 are the only inner chambers of the base frame 20.

Figure 11:
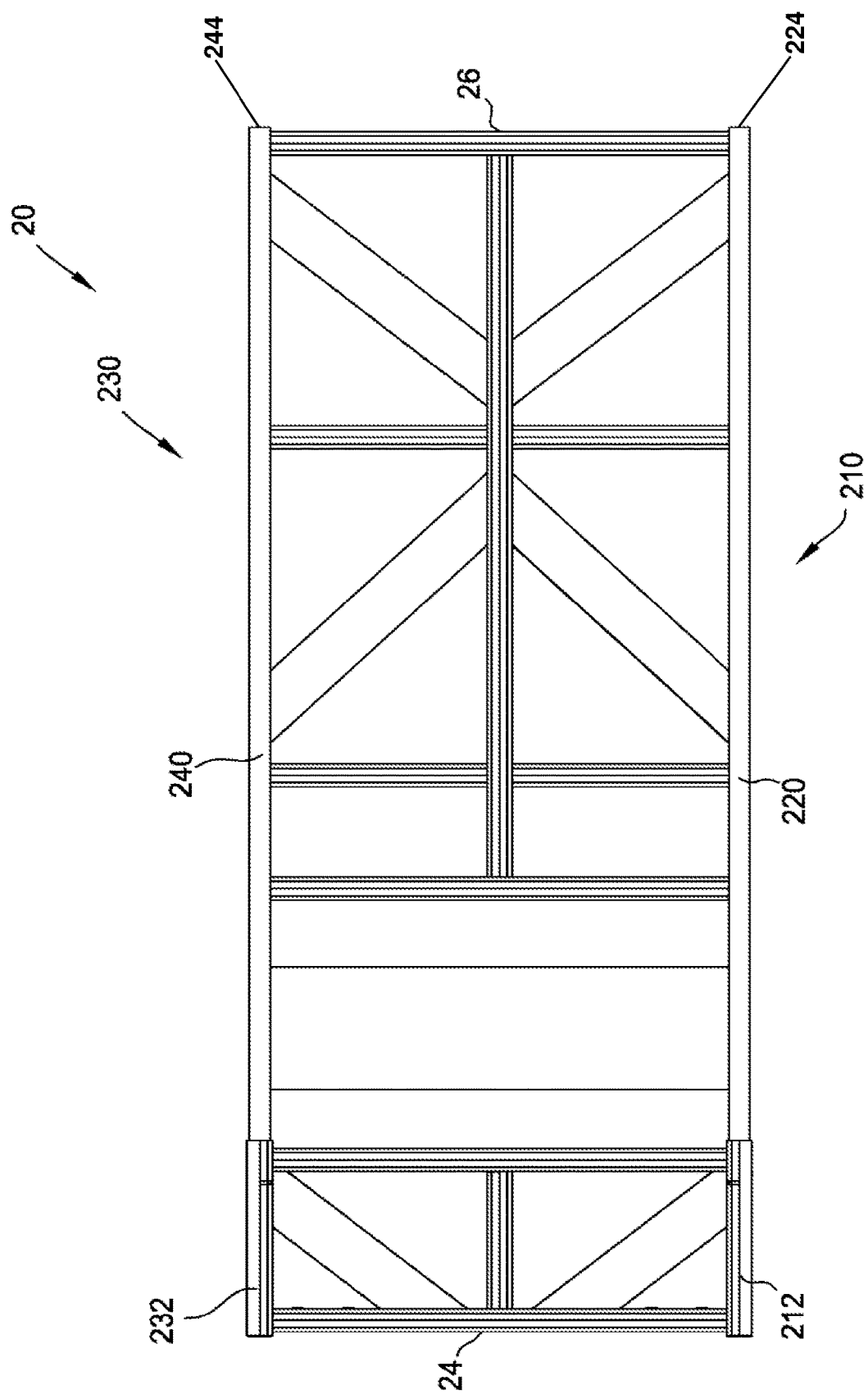
FIG. 11 is a top view of yet another embodiment of a base frame of the vibratory conveyor.

In further embodiments, and with reference to FIG. 11, the first and second mounting plates 220, 240 may extend toward a second end 26 of the base frame such that the second end 224 of the first mounting plate 220 and the second end 244 of the second mounting plate 240 are substantially coterminous with the second end 26 of the base frame 20. That is, the first ends 224 and 244 are planar with the first end 26 shown in FIG. 11. In such embodiments, the first and fourth tubular sidewall segments 212, 236 are the only tubular sidewall segments of the base frame 20, and the first and fourth inner chambers 214, 238 are the only inner chambers of the base frame 20.

Figure 12:
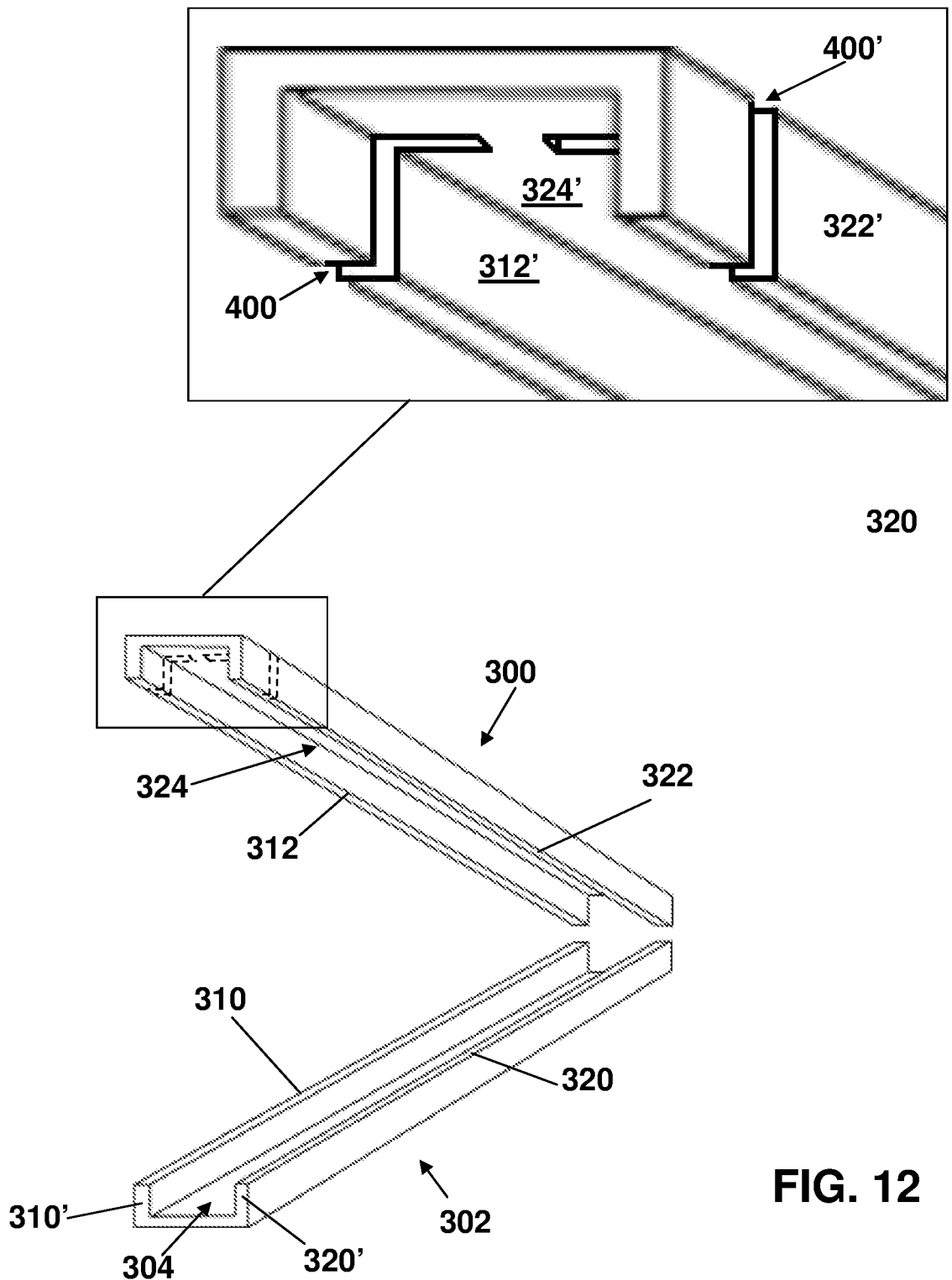
FIG. 12 is a schematic view in perspective illustrating components of a tubular sidewall segment, along with a magnified portion of one component.

The tubular sidewall segments may be formed from separate components by welding those components together. Therefore, in some embodiments, the attachment of the mounting plates 220 and 240 to the tubular sidewall segments 212, 216, 232 and 236 includes one or more steps before the tubular sidewall segments are in tubular form. For example, each of the tubular sidewall segments 212, 216, 232 and 236 may be formed by welding together two U-shaped (alternately referred to as C-shaped) channels 300 and 302 shown in FIG. 12. Such channels 300 and 302 may be the same length and width, and may be aligned as shown in FIG. 12 so that the legs of each channel are in contact or very close. For example, the channels 300 and 302 may be aligned as shown in FIG. 12, and then moved closer together so that the edges 320 and 322 of the legs 320' and 322', respectively, are substantially parallel. In this position, the edges may contact each other or within a short distance of each other, such as one-eighth of an inch apart. The edges are contemplated to be within one inch of each other. Simultaneously, the edges 310 and 312 may be substantially parallel and in contact or within one inch of each other. A weld may then be formed between the edges 310 and 312, and another weld may be formed between the edges 320 and 322. This process of welding the channels 300 and 302, thereby forms one of the tubular sidewall segments 212, 216, 232 and 236 described above.

Figure 13:
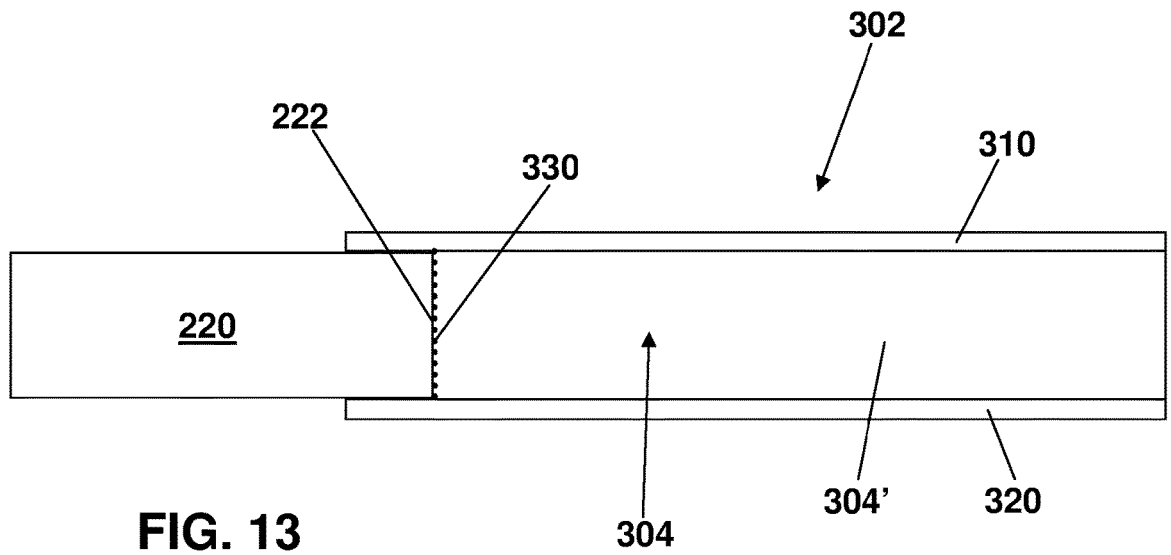
FIG. 13 is a schematic side view illustrating an embodiment of the invention during a process of formation.

Prior to welding the channels 300 and 302 together as described above, one end of a mounting plate may be placed in the gap between the edges of one of the channels. For example, as shown in FIG. 13, the end 222 of the first mounting plate 220 may be placed in the gap 304 between the legs 310' and 320' that define the edges 310 and 320. The end 222 of the first mounting plate 220 is thereby resting against the sidewall 304' that connects the legs 310' and 320'. After the end 222 is positioned in the gap 304, a weld line 330 may be formed where the end 222 contacts the sidewall 304'. Other weld lines (not apparent in FIG. 13) may be formed along lines where the end 222 contacts the legs 310' and 320'. Thus, the end 222 of the first mounting plate 220 may be welded to the channel 302 that is a component of one of the tubular sidewall segments prior to completion of the formation of the tubular sidewall segment. For example, the channels 300 and 302 may be components that form the tubular sidewall segment 212 when welded together.

After the step described above, the channel 300 may be placed over the channel 302 as described above and the edges 310, 312, 320, and 322 may be welded together, thereby completing a respective tubular sidewall segment. Upon completion of this welding, which completes the formation of the tubular sidewall segment 212, the exposed end of the tubular sidewall segment 212 may be welded to the sides of the first mounting plate 220. The welds can extend circumferentially entirely around the first mounting plate 220. This is the weld 202 shown in FIG. 6. A similar welding attachment to that described above may be formed between the first mounting plate 220 and the tubular sidewall segment 216. Similar welding attachments may be formed at and near the ends of the second mounting plate 240 where it joins the tubular sidewall segments 232 and 236, and a circumferential weld is shown in FIG. 6 at reference numeral 204 on the second mounting plate 240.

In this manner, the mounting plates 220 and 240 are welded at spaced distances near each end of the mounting plates. First and second welds are formed at each end of each of the mounting plates, and third and fourth welds are formed at spaced distances from the welds. One pair of spaced welds on the first mounting plate 220 is described above in detail as an example of the pairs of welds at the ends of all mounting plates. At each end of each mounting plate one weld is formed where the interior of the tubular sidewall segment (e.g., segment 212) meets the end of the mounting plate (e.g., first end 222). Another weld is spaced from that first weld, and may be formed, as an example, where the side of the first mounting plate 220 meets the end of the tubular sidewall segment 212. The latter weld is nearer to the apertures 225. By spacing the two welds along the length of the base frame 20, a stronger attachment is formed that resists fracture during use.

As an added step to the embodiments described above, it is contemplated to form additional welds between one portion of the ends of the mounting plates 220 and 240 and the tubular sidewall segments 212, 216, 232 and 236 after one channel (e.g., channel 300) has been welded to the other channel (e.g., channel 302). The portions of the mounting plates to be welded may be the portions that were not welded to a channel prior to the channels being welded together. For example, after the weld 330 (FIG. 13) has been formed, after the edges 312 and 322 of the channel 300 have been welded to the edges 310 and 320 of the channel 302 and, optionally after the circumferential weld 202 has been formed as described above, this additional welding is desirably carried out. The additional welding is accomplished through slots formed in at least one of the sidewalls of the channel components that form the tubular sidewall segments. The slots make accessible for welding those portions of the mounting plates that a channel without slots would otherwise cover. The welding takes place through these slots as described below.

Slots are preferably formed in only one of the channels, and the slots are preferably formed only on the channels that form the inside edges of the tubular sidewall segments 212, 216, 232 and 236. The inside edges are the edges of the tubular sidewall segments that face laterally inwardly, toward the force-balancing member 260 as the inner faces 246 and 256 face. The slots 400, 402, 404 and 406 are shown in FIGS. 5-8 and 10-11, and are particularly well-illustrated in FIG. 6. Only the slots on the top of each tubular sidewall segment are shown in FIGS. 5-8 and 10-11, but it should be noted that there are also slots on the opposite side (the bottom) of each tubular sidewall segment, and these slots are also on the inside edges of each tubular sidewall segment. See FIG. 12.

Each of the slots may be L-shaped with a shorter segment on the top of the respective tubular sidewall segment and a longer segment on the inside of the respective tubular sidewall segment, but this is not critical. The slots 400-406 are formed in the top of each channel and the slot 400' (and other slots that are not visible) are formed in the bottom of each channel prior to being joined with another channel by welding. Each of the slots is desirably, but not critically, aligned with an end of a respective mounting plate after the mounting plate end is joined to the respective tubular sidewall segment's channel. Each slot is an open space that may be filled with molten metal during a conventional welding process (e.g., arc welding), thereby fixing to the sidewalls of the slot the portions of the mounting plate that are exposed by the slot.

Figure 14:
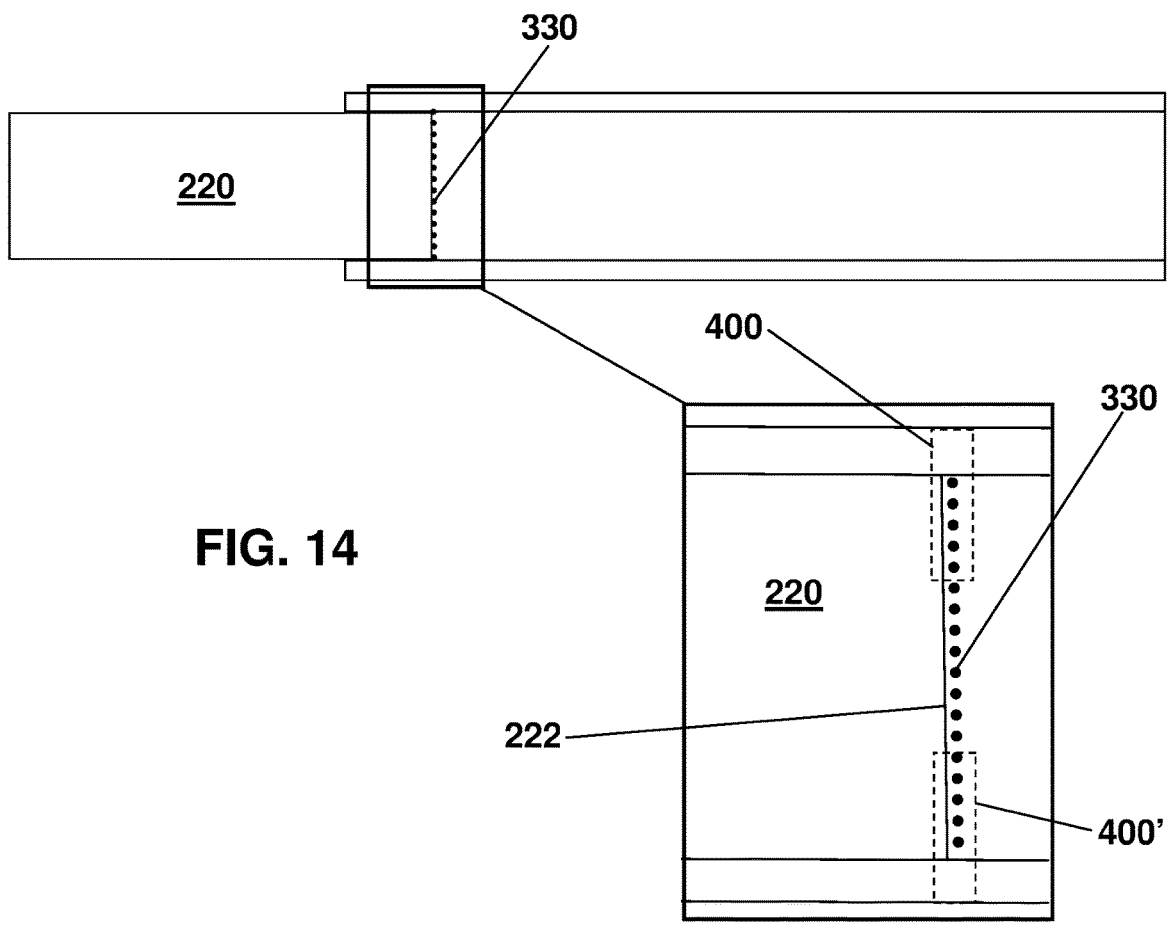
FIG. 14 is a schematic side view illustrating an embodiment of the invention during a process of formation with a magnified portion of one area.

As shown in the magnified portion of FIG. 12, the slots 400 and 400' extend entirely through the legs 312' and 322' and partially through the sidewall 324' of the channel 300 on opposite sides that will become the top and bottom sides. The slot 400' is not visible in FIG. 6, because it is located on the bottom of the tubular sidewall segment 212. Each of the slots 400, 402, 404 and 406 have complementary slots that are not shown in FIG. 6 but are in a similar position to the slots 402-406 that the slot 400' is to the slot 400. The location of the end 222 of the mounting plate 220 relative to the slots 400 and 400' and the first weld 330 is shown in the schematic of FIG. 14. Similar slots may be formed at similar locations at both ends of both mounting plates 220 and 240.

The various components of the vibratory conveyor 100 may be made of any suitable material that allows the conveyor to function as described herein. For example, the components may be made of steel (e.g., stainless steel), aluminum, ultra-high molecular weight (UHMW) polymer, or any suitable material.

Compared to conventional vibratory conveyors, vibratory conveyors of the present disclosure have several advantages. In embodiments in which the first and second mounting plates are solid plates (e.g., solid steel plates), the first and second mounting plates can withstand higher levels of cyclic stresses, reducing the risk of crack formation in the immediate vicinity of the motors. Additionally, concentrating mass near the motor reduces the need for counterweights throughout the base frame. The force-balancing member isolates the high cyclic stresses generated by the motors, allowing the remainder of the base frame to safely be subjected to only the intended pan driving force. By disposing the mounting plates within the tubular sidewall segments, the welds may be moved to the ends of the mounting plate. Placing the welds further from the motors allows the base frame to better withstand the cyclic stresses generated by the motors.

As used herein, the terms "about," "substantially," "essentially," and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A vibratory conveyor comprising:
   (a) a pan for moving material from a first end of the pan to a second end of the pan; and
   (b) a base frame that attaches to and supports the pan, the base frame being disposed adjacent the pan and comprising:
      (i) a first side comprising:
         (1) a first tubular sidewall segment having a first inner chamber; and
         (2) a first mounting plate for mounting a vibratory motor, the first mounting plate having a first end and a second end, wherein the first end of the first mounting plate is disposed within the first inner chamber; and
      (ii) a second side comprising:
         (1) a second tubular sidewall segment having a second inner chamber; and
         (2) a second mounting plate for mounting a vibratory motor, the second mounting plate having a first end and a second end, wherein the first end of the second mounting plate is disposed within the second inner chamber;
   wherein:
      the first side comprises a third tubular sidewall segment having a third inner chamber, the second end of the first mounting plate being disposed within the third inner chamber; and
      the second side comprises a fourth tubular sidewall segment having a fourth inner chamber, the second end of the second mounting plate is disposed within the fourth inner chamber.

2. The vibratory conveyor of claim 1, wherein:
   (a) the first mounting plate is fixed to each of the first and third tubular sidewall segments by at least one weld line; and
   (b) the second mounting plate is fixed to each of the second and fourth tubular sidewall segments by at least one weld line.

3. The vibratory conveyor in accordance with claim 2, wherein the at least one weld line on the first mounting plate comprises:
   (a) a first weld line at the first end of the first mounting plate;
   (b) a second weld line at an end of the first tubular sidewall segment; and
   wherein the first weld line is spaced from the second weld line in the direction of an axis of the base frame extending from the first end of the pan to the second end of the pan.

4. The vibratory conveyor in accordance with claim 3, wherein the first weld line comprises solidified material extending from an exterior of the first tubular sidewall segment to the first mounting plate.

5. The vibratory conveyor in accordance with claim 2, wherein the at least one weld line on the second mounting plate comprises:
   (a) a first weld line at the first end of the second mounting plate;
   (b) a second weld line at an end of the second tubular sidewall segment; and
   wherein the first weld line is spaced from the second weld line in the direction of an axis of the base frame extending from the first end of the pan to the second end of the pan.

6. The vibratory conveyor of claim 1, wherein:
   (a) the first mounting plate has a thickness $T_1$, the length of the first mounting plate that extends into the first inner chamber being at least about $T_1$, the length of the first mounting plate that extends into the third inner chamber being at least about $T_1$; and
   (b) the second mounting plate has a thickness $T_2$, the length of the second mounting plate that extends into the second inner chamber being at least about $T_2$, the length of the second mounting plate that extends into the fourth inner chamber being at least about $T_2$.

7. A vibratory conveyor comprising:
(a) a pan for moving material from a first end of the pan to a second end of the pan; and
(b) a base frame that attaches to and supports the pan, the base frame being disposed adjacent the pan and comprising:
　(i) a first side comprising:
　　(1) a first tubular sidewall segment having a first inner chamber; and
　　(2) a first mounting plate for mounting a vibratory motor, the first mounting plate having a first end and a second end, wherein the first end of the first mounting plate is disposed within the first inner chamber;
　(ii) a second side comprising:
　　(1) a second tubular sidewall segment having a second inner chamber; and
　　(2) a second mounting plate for mounting a vibratory motor, the second mounting plate having a first end and a second end, wherein the first end of the second mounting plate is disposed within the second inner chamber;
(c) a force-balancing member extending between the first and second sides of the base frame, wherein:
　(i) a first end of the force-balancing member is connected to an inner face of the first mounting plate; and
　(ii) a second end of the force-balancing member is connected to an inner face of the second mounting plate;
wherein:
　the first mounting plate has a width and the force-balancing member has a diameter, the ratio of the diameter to the width of the first mounting plate being at least 0.35; and
　the second mounting plate has a width, the ratio of the diameter to the width of the second mounting plate being at least 0.35.

8. The vibratory conveyor of claim 7, further comprising:
(a) a first vibratory motor connected to the first mounting plate by motor mount fasteners; and
(b) a second vibratory motor connected to the second mounting plate by motor mount fasteners.

9. A vibratory conveyor comprising:
(a) a pan for moving material from a first end of the pan to a second end of the pan;
(b) a base frame that supports the pan, the base frame being disposed adjacent the pan and comprising:
(c) a first solid plate having a width;
(d) a second solid plate having a width; and
(e) a cross-member extending continuously between the first solid plate and the second solid plate, the cross-member being a cylindrical tube having a diameter, wherein the ratio of the diameter of the cylindrical tube to the width of the first solid plate is at least 0.35 and the ratio of the diameter of the cylindrical tube to the width of the second solid plate being at least 0.35.

10. The vibratory conveyor of claim 9 wherein the first and second solid plates each have a first end and a second end that are each encapsulated by a tubular sidewall.

11. The vibratory conveyor of claim 9 comprising a first vibratory motor connected to the first solid plate and a second vibratory motor connected to the second solid plate.

12. The vibratory conveyor of claim 9 wherein:
(a) the ratio of the diameter of the cylindrical tube to the width of the first solid plate is at least 0.67; and
(b) the ratio of the diameter of the cylindrical tube to the width of the second solid plate is at least 0.67.

13. A method of manufacturing a vibratory conveyor having a pan, for moving material from a first end of the pan to a second end of the pan, and a base frame attached to and supporting the pan, the method comprising:
(a) disposing a first end of a first mounting plate in a first inner chamber of a first tubular sidewall segment; and
(b) welding the first mounting plate to at least the first tubular sidewall segment by:
　(i) forming a first weld line at the first end of the first mounting plate; and
　(ii) forming a second weld line at an end of the first tubular sidewall segment spaced from the first weld line in the direction of an axis of the base frame extending from the first end of the pan to the second end of the pan.

14. The method of manufacturing a vibratory conveyor in accordance with claim 13, wherein the step of forming the second weld line further comprises forming a weld line through a slot formed in the first tubular segment and forming solidified material extending from an exterior of the first tubular sidewall segment to the first mounting plate.

* * * * *